US010705509B2

(12) United States Patent
Snyder et al.

(10) Patent No.: US 10,705,509 B2
(45) Date of Patent: Jul. 7, 2020

(54) DIGITAL CATALOG FOR MANUFACTURING

(71) Applicant: MADE IN SPACE, INC., Moffett Field, CA (US)

(72) Inventors: Michael Snyder, Mountain View, CA (US); Jason Dunn, Mountain View, CA (US); Aaron Kemmer, Mountain View, CA (US); Michael Chen, Mountain View, CA (US)

(73) Assignee: MADE IN SPACE, INC., Moffett Field, CA (US)

( * ) Notice: Subject to any disclaimer, the term of this patent is extended or adjusted under 35 U.S.C. 154(b) by 382 days.

(21) Appl. No.: 14/860,170

(22) Filed: Sep. 21, 2015

(65) Prior Publication Data

US 2016/0082665 A1    Mar. 24, 2016

Related U.S. Application Data

(60) Provisional application No. 62/053,215, filed on Sep. 21, 2014.

(51) Int. Cl.
*G06F 19/00* (2018.01)
*G05B 19/4099* (2006.01)
(Continued)

(52) U.S. Cl.
CPC ........ *G05B 19/4099* (2013.01); *B29C 64/106* (2017.08); *B29C 64/20* (2017.08);
(Continued)

(58) Field of Classification Search
CPC ..... B29C 64/106; B29C 64/20; B29C 64/118; B29C 64/141; B29C 64/209;
(Continued)

(56) References Cited

U.S. PATENT DOCUMENTS 3,355,117 A    11/1967 Gerhardt
3,633,835 A    1/1972 Beers
(Continued)

FOREIGN PATENT DOCUMENTS

JP    2009013395    1/2009

OTHER PUBLICATIONS

Baechler et al., "Distributed Recycling of Waste Polymer into RepRep Feedstock" Rapid Prototyping Journal, 19(2), pp. 118-125(2013). (Year: 2013).
(Continued)

*Primary Examiner* — Robert G Bachner
(74) *Attorney, Agent, or Firm* — Terry M. Sanks, Esq.; Beusse Wolter Sanks & Maire, PLLC

(57) ABSTRACT

A manufacturing system including catalog database for retaining a plurality of three-dimensional content for use to at least one of create a produced object and repair an existing object with at least one additive manufacturing process, one or more user interfaces to access the catalog database at least one of simultaneously and at different times, a communication infrastructure to provide for real-time communication between the catalog database and the one or more user interfaces, and a manufacturing system comprising at least one user interface to apply the at least one additive manufacturing process to at least one of create the produced object and to repair the existing object. Methods are also disclosed.

25 Claims, 11 Drawing Sheets

(51) Int. Cl.
| | |
|---|---|
| *B33Y 10/00* | (2015.01) |
| *B33Y 30/00* | (2015.01) |
| *B33Y 40/00* | (2020.01) |
| *B29C 64/20* | (2017.01) |
| *B29C 64/35* | (2017.01) |
| *B29C 64/106* | (2017.01) |
| *B29C 70/68* | (2006.01) |

(52) U.S. Cl.
CPC ............. *B29C 64/35* (2017.08); *B29C 70/68* (2013.01); *B33Y 10/00* (2014.12); *B33Y 30/00* (2014.12); *B33Y 40/00* (2014.12); *G05B 2219/35134* (2013.01); *G05B 2219/49007* (2013.01); *Y02P 90/265* (2015.11)

(58) Field of Classification Search
CPC ..... B29C 64/259; B29C 64/386; B29C 64/25; B29C 48/30; B29C 64/35; B29C 70/68; B29C 2793/009; B29C 41/042; B33Y 10/00; B33Y 40/00; B33Y 30/00; B33Y 50/02; B33Y 70/00; B33Y 80/00; C08L 67/02; C08L 2666/02; C08L 59/00; C08L 75/04; C08L 2666/14; C08L 2666/54; C08L 27/12; C08L 63/00
See application file for complete search history.

(56) References Cited

U.S. PATENT DOCUMENTS

| | | | |
|---|---|---|---|
| 4,093,135 | A | 6/1978 | Hermanns |
| 4,925,512 | A | 5/1990 | Briand |
| 5,407,624 | A | 4/1995 | Engh, III et al. |
| 6,575,548 | B1 | 6/2003 | Corrigan et al. |
| 7,122,246 | B2 | 10/2006 | Comb et al. |
| 7,168,935 | B1 | 1/2007 | Taminger et al. |
| 8,201,717 | B2 | 6/2012 | Varga et al. |
| 8,983,957 | B2 | 3/2015 | Rathod |
| 10,265,911 | B1 | 4/2019 | Capri |
| 2001/0030383 | A1 | 10/2001 | Swanson et al. |
| 2003/0173448 | A1 | 9/2003 | Angold et al. |
| 2003/0235635 | A1 | 12/2003 | Fong et al. |
| 2004/0035542 | A1 | 2/2004 | Ederer et al. |
| 2004/0159593 | A1 | 8/2004 | Allen et al. |
| 2005/0129941 | A1 | 6/2005 | Comb et al. |
| 2005/0194401 | A1 | 9/2005 | Khoshnevis |
| 2008/0087372 | A1 | 4/2008 | Jones et al. |
| 2008/0150192 | A1 | 6/2008 | Perret et al. |
| 2008/0254292 | A1 | 10/2008 | Kim |
| 2009/0106560 | A1* | 4/2009 | Chopart .................. G06F 21/51 713/189 |
| 2009/0208577 | A1 | 8/2009 | Xu et al. |
| 2009/0267269 | A1 | 10/2009 | Lim et al. |
| 2010/0332599 | A1* | 12/2010 | Tapolcai ............... G06F 9/5066 709/205 |
| 2012/0037739 | A1* | 2/2012 | Lovranich ............. B02C 18/148 241/277 |
| 2012/0113473 | A1 | 5/2012 | Pettis |
| 2013/0209600 | A1 | 8/2013 | Tow |
| 2013/0301874 | A1* | 11/2013 | Welch ............... G06F 17/30864 382/103 |
| 2014/0046473 | A1* | 2/2014 | Boynton ............ H04N 1/00827 700/119 |
| 2014/0048970 | A1 | 2/2014 | Batchelder et al. |
| 2014/0277659 | A1* | 9/2014 | Kumar ................ G05B 19/4097 700/97 |
| 2014/0316546 | A1 | 10/2014 | Walsh et al. |
| 2015/0108687 | A1* | 4/2015 | Snyder .................. B29C 64/386 264/308 |
| 2015/0186757 | A1 | 7/2015 | Priyadarshi |
| 2016/0023486 | A1 | 1/2016 | Priyadarshi |
| 2016/0042255 | A1* | 2/2016 | Ganesh .................. G06K 15/02 358/1.15 |
| 2016/0082664 | A1* | 3/2016 | Snyder ................ B29C 67/0088 700/98 |
| 2016/0082665 | A1* | 3/2016 | Snyder ............... G05B 19/4099 700/98 |
| 2016/0371472 | A1* | 12/2016 | Walsh .................... H04L 63/102 |
| 2017/0063821 | A1* | 3/2017 | Chen ....................... H04L 63/08 |
| 2017/0072643 | A1 | 3/2017 | Ng et al. |
| 2017/0341795 | A1* | 11/2017 | Colson ................... B65B 57/12 |

OTHER PUBLICATIONS

Edmunson et al., "In Situ Manufacturing is a Necessary Part of Any Planetary Architecture", NASA Concepts and Approaches for Mars Exploration (Jun. 2012) (https://ntrs.nasa.gov/archive/nasa/casi.ntrs.nasa.gov/20120015309.pdf). (Year: 2012).

Cooper et al., "Microgravity Manufacturing Via Fused Deposition", NASA Marshall Space Flight Center Report (Jul. 1, 2003) (https://ntrs.nasa.gov/archive/nasa/casi.ntrs.nasa.gov/20030067856.pdf). (Year: 2003).

Nasa, "The Space Station Integrated Refuse Management System", Final Report Submitted to Universities Space Research Association (May 1988). (Year: 1988).

Dunn et al., "3D Printing in Space: Enabling New Markets and Accelerating the Growth of Orbital Infrastructure", Space Manufacturing 14: Critical Technologies for Space Settlement—Space Studies Institute (Oct. 2010). (Year: 2010).

* cited by examiner

DIGITAL CATALOG FOR MANUFACTURING

CROSS REFERENCE TO RELATED APPLICATIONS

This application claims priority to U.S. Provisional Patent Application No. 62/053,215 filed Sep. 21, 2014, by the Applicant, the subject matter of which is incorporated herein by reference in its entirety. This application also incorporates the subject matter of the following patent applications in their entireties by reference: U.S. application Ser. No. 14/331,729 filed Jul. 15, 2014, which claims the benefit of U.S. Provisional Application No. 61/893,286 filed Oct. 21, 2013; U.S. Provisional Application No. 61/908,750 filed Nov. 26, 2013; and U.S. Provisional Application No. 61/931,568 filed Jan. 25, 2014. The present application is also related to U.S. patent application entitled "Terrestrial and Space-Based Manufacturing Systems" filed Sep. 21, 2015, by the Applicant, which claims priority to U.S. Provisional Application No. 62/053,210 filed Sep. 21, 2014; and U.S. patent application entitled "Seamless Scanning and Production Devices and Methods" filed Sep. 21, 2015, by the Applicant, which claims the benefit of U.S. Provisional Application No. 62/053,220 filed Sep. 21, 2014, the subject matter of both being incorporated herein by reference in their entireties. The present application is also related to U.S. Provisional Application No. 62/162,626 filed May 15, 2015, and incorporated herein by reference in its entirety.

FIELD OF THE DISCLOSURE

Embodiments generally relates to manufacturing and, more particularly, to systems, methods, and computer program products for creating objects via modular assemblies containing multiple manufacturing devices integrated with searchable databases.

BACKGROUND

Digital manufacturing processes are known in the art. Digital manufacturing refers to any process by Which an object is produced from a three-dimensional model or various other computational instructions. Object production relies heavily on additive manufacturing processes, also known as "3D printing." Such additive manufacturing processes form an object by depositing successive layers of material via a robotic device operating under instructions sent to it from a computing device.

Current additive manufacturing processes are capable of reproducing about 20 percent of the world's manufactured goods. More goods may become producible as technology evolves. Some of items that are currently able to be produced via digital manufacturing processes include shoes, clothing, toys, and chocolates, just to name a few. No matter What is being produced, however, instructions are needed to facilitate production.

Two potential problems may arise when a user desires to produce something via digital manufacturing. One is that a desired product may be known, but instructions for producing the product cannot be found/do not exist. This is due in part to the fact that many companies do not publish parts that they make and/or use. Another problem may arise when a user desires to make a part to accomplish a certain task or to have certain characteristics, but is unaware of what the part is called, or even if it exists.

Given the foregoing, systems, methods, and computer program products are needed which facilitate the procurement and storage of instructions for digitally manufacturing a vast plethora of objects in a comprehensive, updateable, and organized fashion. A means of generating instructions/models to digitally manufacture unknown and/or non-existent products is also desired.

SUMMARY

This Summary is provided to introduce a selection of concepts. These concepts are further described below in the Detailed Description section. This Summary is not intended to identify key features or essential features of this disclosure's subject matter, nor is this Summary intended as an aid in determining the scope of the disclosed subject matter.

Embodiments relate to a system and method for creating objects via modular assemblies containing multiple manufacturing devices integrated with searchable databases. The system comprises a catalog database for retaining a plurality of three-dimensional content for use to at least one of create a produced object and repair an existing object with at least one additive manufacturing process. The system also comprises one or more user interfaces to access the catalog database at least one of simultaneously and at different times. The system also comprises a communication infrastructure to provide for real-time communication between the catalog database and the one or more user interfaces. The system further comprises a manufacturing system comprising at least one user interface to apply the at least one additive manufacturing process to at least one of create the produced object and to repair the existing object.

The method comprises receiving information at a catalog database that retains a plurality of three-dimensional content for use to at least one of create a produced object and repair an existing object with at least one of additive manufacturing process, transmission of the information is performed with a user interface over a communication infrastructure to provide real-time communication between the catalog database and a plurality of user interfaces. The method further comprises locating a three-dimensional content to at least one of create the produced object and repair the existing object responsive to information received by use of the user interface. The method also comprises communicating the located three-dimensional content to a manufacturing system specific to the user interface. The method further comprise applying at least one additive manufacturing process of the manufacturing system to at least one of create the produced object and to repair the existing object.

Another method comprises receiving a request for three-dimensional content at a catalog database to at least one of create a produced object and repair an existing object with at least one additive manufacturing process. This method also comprises creating a digital key to authenticate the three-dimensional content, and providing the digital key to a manufacturing system to apply at least one additive manufacturing process to allow the manufacturing system to access the three-dimensional content. The method also comprises at least one of creating the produced object and repairing the existing object, and releasing the at least one of produced object and the existing object to a user.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
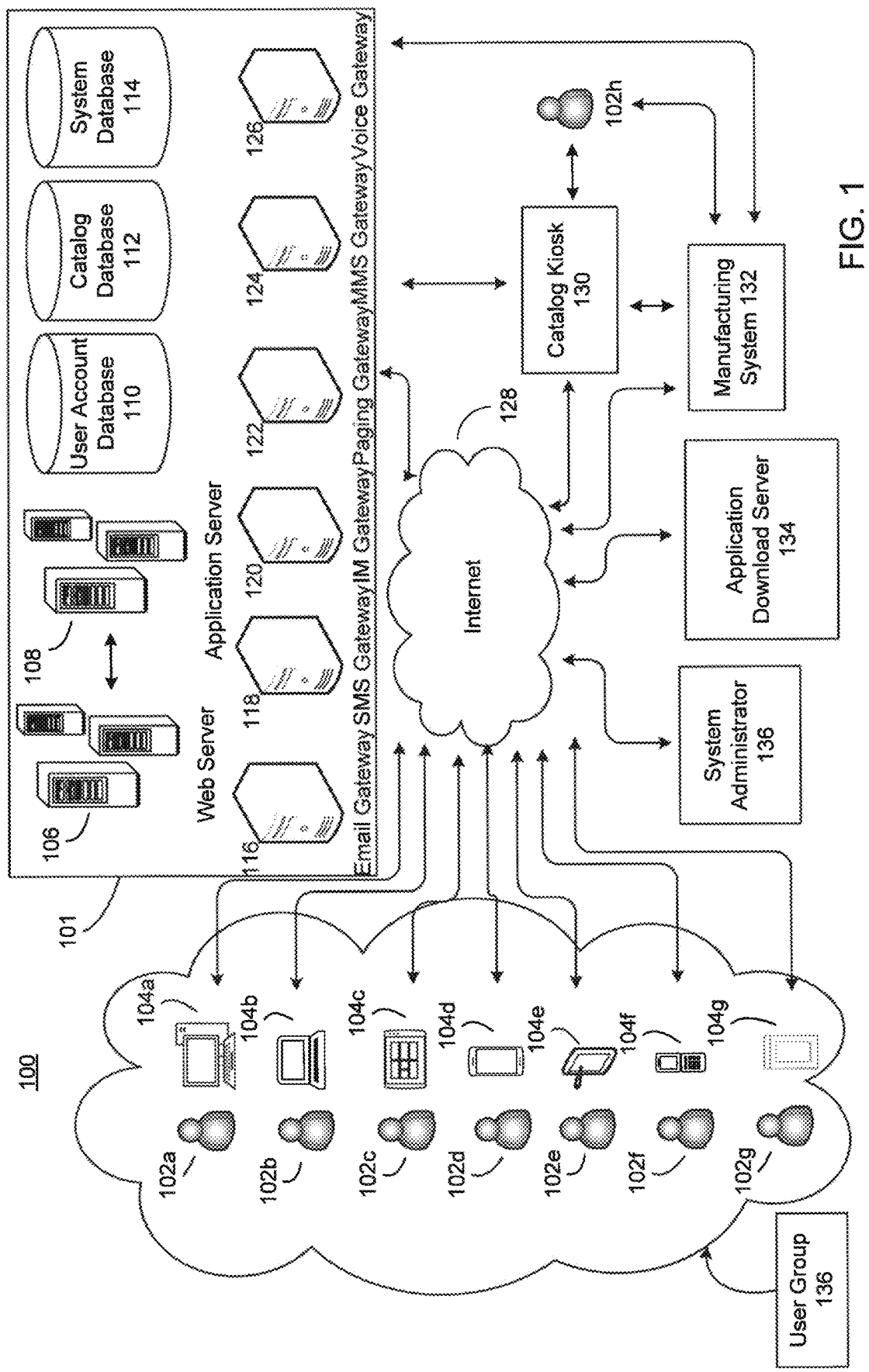
FIG. 1 is a block diagram of an embodiment of a catalog database system for facilitating the identification of, design of, and production of objects via digital manufacturing.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Embodiments are directed to systems, methods, and computer program products which facilitate the creation, maintenance, and utilization of a catalog database of objects that may be generated by a digital manufacturing system. In an embodiment, the catalog database may contain digital three-dimensional models and similar computational instructions for digitally manufacturing an object via a digital manufacturing system, such as an additive manufacturing system.

Referring now to FIG. 1, a block diagram of an embodiment of a catalog database system 100 for facilitating the identification of, design of and production of objects via digital manufacturing is shown. A cloud-based, Internet-enabled device communication system 100 includes a plurality of users 102 (shown as users 102*a-g* in FIG. 1) accessing, via a user computing device 104 (shown as respective computing devices 106*a-g* in FIG. 1) and a network 128, such as, but not limited to, the global, public Internet—an application service provider's cloud-based, Internet-enabled infrastructure 101. In an embodiment, a user application may be downloaded onto a user computing device 104 from an application download server 134 via a network 128. In another embodiment, the infrastructure 101 may be accessed via a website or web application.

Multiple users 102 may, simultaneously or at different times, access (via, as a non-limiting example, a user application) the infrastructure 101 in order to engage in communication with a manufacturing system 132 or to access a user account database 110, catalog database 112, and/or a system database 114.

In an embodiment, a user 102*h* may use a catalog kiosk 130 to access the infrastructure 101 and/or the manufacturing system 132. The catalog kiosk 130 may allow the user 102*h* to access the infrastructure 101 and/or the manufacturing system 132 with or without the use of the network 128. The kiosk 130 may comprise a display screen, as well as one or more microphones, speakers, scanning devices, cameras, motion sensors, motion capture devices, keyboards, touchscreens, joysticks, mouses, and/or any similar input/output devices as will be appreciated by those skilled in the relevant art(s) after reading the description herein.

In an embodiment, the user 102*h* may access the infrastructure 101 directly via the manufacturing system 132, either with or without connectivity provided by the network 128. In an embodiment, the manufacturing system 132 may comprise hardware and software elements that allow it to access, search, and utilize content from the user account database 110, catalog database 112, and system database 114. Additionally, the manufacturing system 132 may comprise a display screen, as well as one or more microphones, speakers, scanning devices, cameras, motion sensors, motion capture devices, keyboards, touchscreens, joysticks, mouses, and/or any similar input/output devices as will be appreciated by those skilled in the relevant art(s) after reading the description herein.

Figure 9:
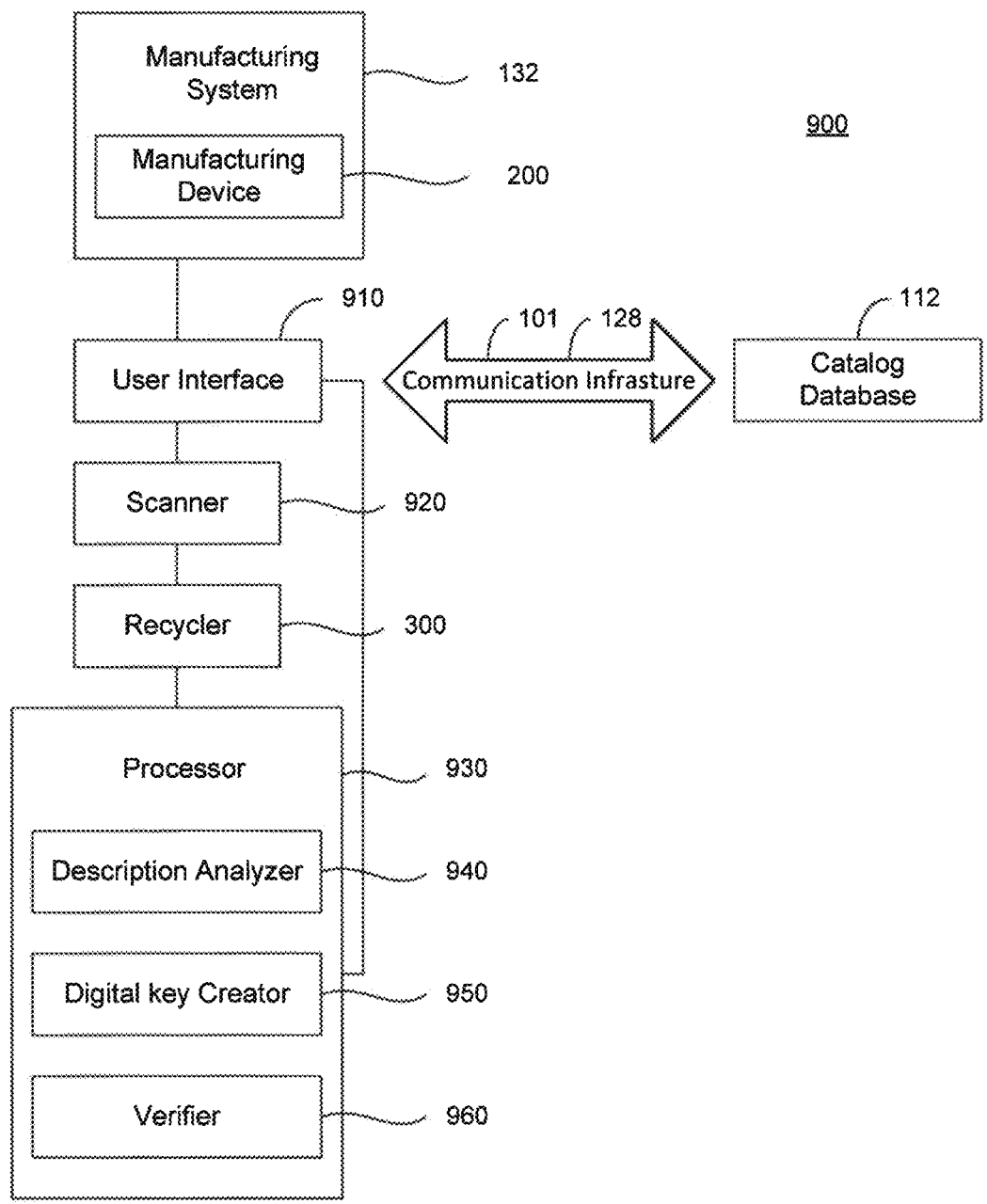
FIG. 9 is a block diagram of an embodiment of a portion of a system disclosed herein.

In an embodiment, the manufacturing system 132 may comprise an additive manufacturing device 200, as shown in FIG. 9 and discussed further herein.

The user 102 may access the infrastructure 101 in order to access and/or store content from/in the user account database 110, catalog database 112, and/or system database 114. Specifically, the user 102 may access the infrastructure 101 in order to, among other things: upload and/or download three-dimensional models and computer instructions for generating objects, input or edit user credentials, and/or learn how and where desired objects may be generated.

In an embodiment, the user computing device 104 may be configured as: a desktop computer 104*a*; a laptop computer 104*b*; a tablet or mobile computer 104*c*; a smartphone (alternatively referred to as a mobile device) 104*d*; a Personal Digital Assistant (PDA) 104*e*; a mobile phone 104*f*; a handheld scanner 104*g*; any commercially-available intelligent communications device; or the like. Such computing devices may comprise sensors such as a camera, a CCD, a near-field communications transceiver, a Bluetooth® chip (a wireless technology standard standardized as IEEE 802.15.1), a GPS sensor, and the like. Such sensors may be configured to detect the environmental elements, physical assets, and the like.

An application service provider's cloud-based, communications infrastructure 101 may include one or more web servers 106, one or more application servers 108, user account database 110, catalog database 112, system database 114, an email gateway 116, an SMS gateway 116, an Instant Message (IM) gateway 118, a paging gateway 120, a voice gateway and an MMS gateway 124. In an embodiment, the one or more application servers 108 may contain computational instructions, or code, that enables the functionality of system 100. In an embodiment, the user account database 110, catalog database 112, and/or system 114 are not contained within the infrastructure 101. In an embodiment, one or all of these databases are supplied by a third-party.

The user account database 110 contains account information for each user 102 within a user group 134 of system 100, including but not limited to log in credentials; user location information; type of computing device 104 used; type of manufacturing system 132 used previously (if applicable); user account settings and preferences; records of objects previously uploaded, downloaded, and/or generated; infrastructure 101 usage; and the like. In an embodiment, the user account database 110 may further contain payment/billing information for each user 102 within user group 134 of system 100.

The catalog database 112 contains three-dimensional models and/or computerized instructions for generating an object via a digital manufacturing process such as, by way of example and not limitation, additive manufacturing processes and the like, including three-dimensional printing. Every object contained within the catalog database 112 may be integrated with a barcode/QR code or other similar means of associating physical objects with their corresponding models and/or instructions within the database 112 quickly and easily via a scan. Additional object information contained within the database 112 may include the materials, functionality, and safety information related to/integrated with each object, as well as other similar information as may become apparent to those skilled in the relevant art(s) after reading the description herein.

The system database 114 contains information regarding all of the potential manufacturing systems 132 that may be used with the system 100. The manufacturing system 132 may comprise an additive manufacturing device, such as additive manufacturing device 200 (not shown in FIG. 1 but shown in FIGS. 2 and 9), or any other similar device/system as may become apparent to those skilled in the relative art(s) after reading the description herein.

In an embodiment, a system administrator 136 may access the infrastructure 101 via the network 128 in order to oversee and manage the infrastructure 101.

In another embodiment, the user account database 110, catalog database 112, and system database 114 may comprise one or more data stores within (or remotely located from) infrastructure 101 or be a memory included in (or coupled to) web server 106.

The user account database 110, catalog database 112, and system 114 may be physically separate from one another, logically separate, or physically or logically indistinguishable from each other.

As will be appreciated by those skilled in the relevant art(s) after reading the description herein, in such an embodiment, an application service provider—an individual person, business, or other entity—may allow access, on a free registration, paid subscriber and/or pay-per-use basis, to the infrastructure 101 via one or more World-Wide Web (WWW) sites on the Internet 128. Thus, the system 100 is sealable.

As will also be appreciated by those skilled in the relevant art(s), in an embodiment, various screens would be generated by the server 106 in response to input from users 102 over the Internet 128. That is, in such an embodiment, the server 106 is as typical web server running a server application at a website which sends out webpages in response to Hypertext Transfer Protocol (HTTP) or Hypertext Transfer Protocol Secured (HTTPS) requests from remote browsers on various computing devices 104 being used by various users 102. Thus, the server 106 is able to provide a graphical user interface (GUI) to users 102 of the system 100 in the form of webpages. These webpages are sent to the user's PC, laptop, mobile device, PDA or like device 104, and would result in the GUI being displayed.

As will be appreciated by those skilled in the relevant art(s) after reading the description herein, alternate embodiments of the present disclosure may include providing a tool for facilitating content sharing coupled with a producer-designated physical asset to the devices 104 as a stand-alone system (e.g., installed on one server PC) or as an enterprise system Wherein all the components of the infrastructure 100 are connected and communicate via an inter-corporate Wide Area Network (WAN) or Local Area Network (LAN). As a non-limiting example, where the users 102 are all personnel/employees of the same company, an embodiment may be implemented as a stand-alone system, rather than as a web service (i.e., Application Service Provider (ASP) model utilized by various unassociated/unaffiliated users) as shown in FIG. 1.

As will also be appreciated by those skilled in the relevant art(s) after reading the description herein, an embodiment may include providing the tools for facilitating content sharing coupled with a producer-designated physical asset via the infrastructure 101 and the devices 104 via a browser or operating system pre-installed with an application or a browser or operating system with a separately downloaded application on such devices 104. That is, as will also be apparent to one skilled in the relevant art(s) after reading the description herein, the application that facilitates the content sharing platform herein, may be part of the "standard" browser or operating system that ships with the computing device 104 or may be later added to an existing browser or operating system as part of an "add-on," "plug-in," or "app store download."

Figure 2:
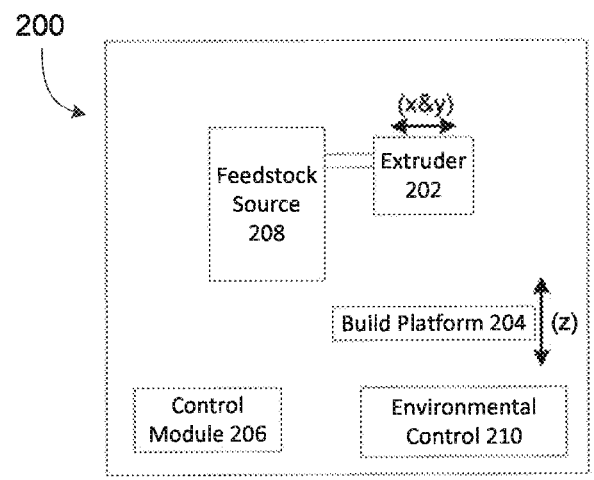
FIG. 2 is a block diagram of an embodiment of an additive manufacturing device for use with a catalog database system.

Referring now to FIG. 2, a block diagram of an exemplary additive manufacturing device 200 for use with the catalog database system 100 is shown. In an embodiment, the additive manufacturing device 200 is configured to produce parts based on instructions and other commands from the system 100. The additive manufacturing device 200 may be configured to utilize polymer filament, metal filament, filament made from a mixture of materials, and the like.

The additive manufacturing device 200 comprises a filament extruder 202 positionable in two axes (e.g., x and y axes). The additive manufacturing device 200 may be a fused deposition-type device or any other additive manufacturing device apparent to those skilled in the relevant art after reading the description herein, including but not limited to a stereolithographic device, an electron beam freeform fabrication device, and a selective laser sintering device.

The additive manufacturing device 200 further comprises a build platform 204 positionable in a third axis (e.g., the z-axis). The build platform 204 is configured to support parts as they are being constructed. In another embodiment, the build platform 204 is omitted. The build platform 204 is a support Which holds another part, thereby enabling the additive manufacturing device 200 to add additional portions (i.e., layers) to the part being held. Actuators (not shown) are attached to the filament extruder 202 and the build platform 204. In an embodiment, the additive manufacturing device 200 comprises one actuator for each axis.

The filament extruder 202 is adapted to create a desired part on build platform 204 via deposition of a polymer or other material. Deposition may be done in an additive manner, such as a layer-wise or raster pattern. The positions of the filament extruder 202 and the build platform 204 during construction may be controlled by a build control module 206, electrically connected to each actuator. The build control module 206 may be software, hardware, or a combination of software and hardware. The build control module 206 is configured to cause the desired part (e.g., a support structure) to be produced by additive manufacturing device 200.

The filament extruder 202 is connected to a feedstock source 208. The feedstock source 208 houses and supplies material necessary to produce on or more parts via additive manufacturing device 200. In an embodiment, the feedstock source 208 is a spool of polymer filament threaded into filament extruder 202. The extruder 202 is configured to heat the polymer filament to its inciting point and deposit the melted polymer in order to form the desired part.

An environmental control 210 is configured to regulate the environment of the additive manufacturing device 200. In an embodiment, the environmental control 210 comprises at least one fan, a temperature regulation device (e.g., a heater, an air conditioning unit), and a filter. The environmental control 210 regulates one or more of temperature, humidity, and air quality within the additive manufacturing device 200, thereby preventing outgassing and contamination of the environment in which the additive manufacturing device 200 is located during operation.

Figure 3:
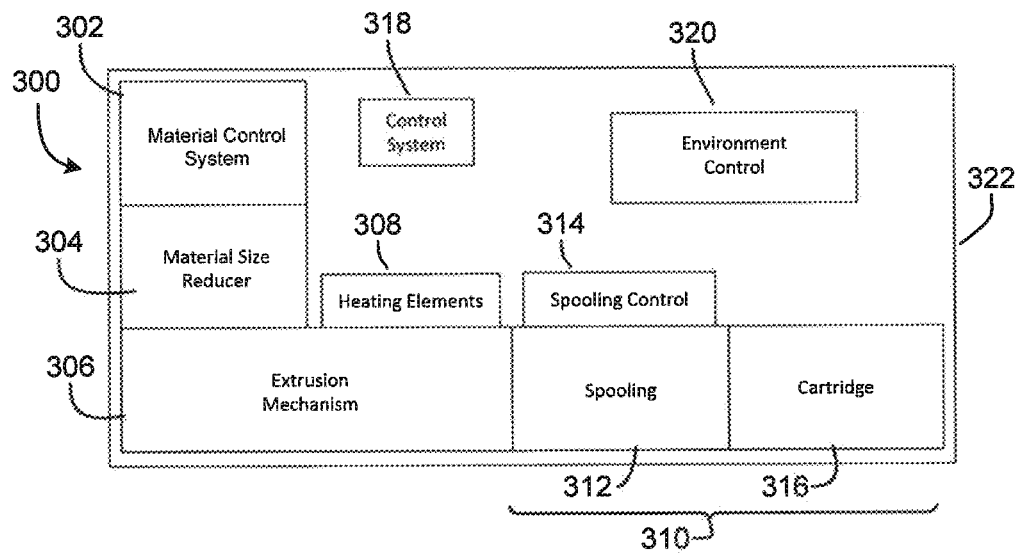
FIG. 3 is a block diagram of an embodiment of a recycler device for use with a catalog database system.

Referring now to FIG. 3, a block diagram of an exemplary recycler device 300 for use with catalog database system 100 is shown. A recycler device 300 is configured to accept materials such as trash, broken or obsolete parts, rejected parts produced via processes herein, in-situ materials, and the like and convert the materials to a feedstock such as a filament. The recycler device 300 comprises a material control system 302, a material size reducer 304, an extruder 306, and a spooling assembly 310. Recycler device 300 may further comprise heating elements 308, control system 318, and environmental control 320. Some or all of the portions of the recycler device 300 may be contained within a housing 322.

The material control system 302 drives material towards desired locations in recycler device 300. The material control system 302 may comprise direct or indirect airflow systems (e.g., fans, air compressors) pressure fed systems, or physical contacting devices in order to drive material through recycler device 300. In another embodiment, the material control system 302 is a centrifuge which spins recycler device 300, thereby using centrifugal forces to force material into other properly positioned portions of recycler device 300. In another embodiment, the material is a magnetic or paramagnetic material and material control system comprises electromagnets which drive material through the recycler device 300.

A size reducer 304 reduces the size of materials inserted into the recycler device 300 from their original size to a shape and size suitable for use in the extruder 306. The size reducer 304 may shred, grind, cut, and/or pulverize material into portions small enough for utilization by the extruder 306. In an embodiment, the extruder 306 requires materials no larger than three millimeters in diameter. The size reducer 304 is configured to break material apart into portions no larger than three millimeters in diameter.

The extruder 306 receives material from the size reducer 304, further manipulates the size and shape of the material, heats the material via one or more attached heating elements 308 and pushes the pliable or molten material through a die. Material may be moved through the extruder 306 via an auger, a piston, another mechanism apparent to those skilled in the relevant art(s) or a combination thereof.

A heating element 308 heats the barrel portion of the extruder 306, causing the material within to reach a deformable state. The heating elements 308 are controlled by a control system 318 which monitors the temperature of the material within the extruder 306 and maintains the temperature at a desired level.

A spooling assembly 310 is configured to receive filament as it exits the extruder 306 at the die and spool filament onto a spool suitable for utilization by additive manufacturing device 200. The spooling assembly 310 may comprise a spooling mechanism 312, such as a rotating wheel configured to receive and spool filament. One or more portions of spooling assembly may be controlled by a spooling control 314. The spooling control 314 may be controlled by an attending technician or controlled by a control system 318. In an embodiment, filament is spooled within a removable cartridge 316. The cartridge 316 stores and contains filament for later use or disposal. In an embodiment, the cartridge 316 is configured to be removed from the recycler device 300 and interface with an additive manufacturing device.

Filament may be created from polymers, metals, and other materials that are capable of being broken down and reconstituted. The filament may be any type of thermoplastic or any other material apparent to those skilled in the relevant art(s) after reading the description herein.

The environmental control 320 is configured to regulate the environment of the recycler device 300. In an embodiment, the environmental control 320 comprises at least one fan, a temperature regulation device (e.g., a heater, an air conditioning unit), and a filter. The environmental control 320 regulates one or more of temperature, humidity, and air quality within recycler device 300, thereby preventing outgassing and contamination of the environment in which additive manufacturing device 300 is located during operation.

The recycler device 300 may comprise housing 322 which contains each element of recycler device 300, enabling control of the environment of recycler device 300 by environmental control 320.

The control system 318 may be software, hardware, or a combination of software and hardware. The control system 306 is configured to facilitate and control operation of recycler device 320, converting materials inserted into recycler device 300 into feedstock or another form, such as filament.

The recycler device 300 is configured to control the movement of the material throughout each portion of recycler device 300 as the material is converted to filament. The material is guided into the extruder 306 in a controlled manner in order to avoid air pockets or other gaps.

The recycler device 300 may be adapted for use in a variety of environments, including in an office, in a home, in an industrial setting, in a research laboratory, and aboard naval vessels (e.g., ships, submarines), particularly in enclosed locations. Other locales where the recycler device 300 may be utilized include remote locations, isolated locations, and in space. More specifically, in an embodiment, the recycler device 300 is configured to meet all power, volume, mass, and safety requirements for operation aboard the International Space Station ("ISS"). In another embodiment, the recycler device 300 is can operate aboard a naval vessel (surface or underwater), including a vessel underway.

Figure 4:
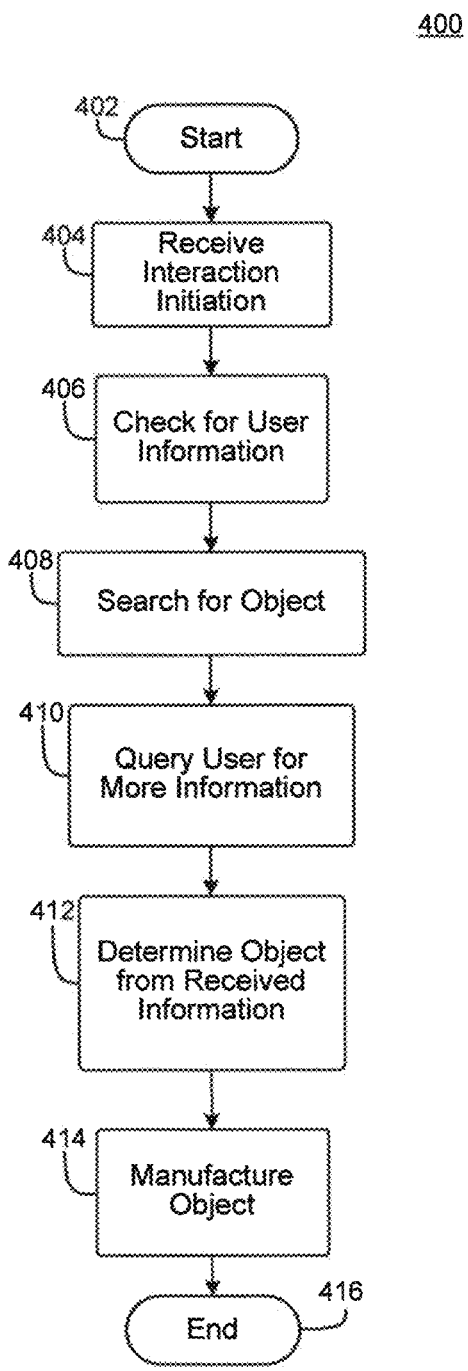
FIG. 4 is a flowchart depicting an embodiment of a process for manufacturing an object using a manufacturing system integrated with a catalog database.

Referring now to FIG. 4, a flowchart, depicting an embodiment of a process 400 for manufacturing an object using the manufacturing system 132 integrated with the catalog database 112 is shown. The process 400, which may execute within the system 100, begins at step 402 with control passing immediately to step 404. At step 404, the manufacturing system 132 receives an interaction initiated by the user 102. The interaction may comprise a voice command or other audio sound, a gesture or other type of movement, and/or physical contact. Types of physical contact may include directly touching a portion of the manufacturing system 132, such as a touchscreen, keyboard, joystick, mouse, or any other similar component as will be appreciated by those skilled in the relevant art(s) after reading the description herein. In another embodiment, the user-initiated interaction is received by a computing device 104 and/or catalog kiosk 130.

At step 406, the user interface within the manufacturing system 132, computing device 104, and/or catalog kiosk 130 searches internally and externally for user information. Such information may be either stored within memory components within the system 132, device 104, and/or kiosk 130, and/or it may be stored within user account database 110. Such user information may include previous objects uploaded, downloaded, and/or generated, type of the manufacturing system 132 normally used by the user 102, the user 102 location, payment information regarding the user 102's use of the system 100, and/or any similar information as my be apparent to those skilled in the relevant art(s) after reading the description herein.

In an embodiment, the user interface may be simple or complex in nature. It may be further used to search the catalog database 112 and may use grouping and/or categorical search techniques to make searching easier.

In an embodiment, the user interface only begins checking for user information once the identity of the user 102 has been verified. Such verification may be accomplished by receiving a password or code from the user 102; capturing an image of all or portions of the user 102's body, including by not limited to the user 102's retinas, fingerprints, and the like; capturing an audio recording of the user 102's voice, perhaps saying a password or code; or by any other similar means as will be appreciated by those skilled in the relevant art(s) after reading the description herein.

At step 408, a properly authorized user 102 may search for an object to be generated by manufacturing system 132. An object may be searched for by utilizing a variety of search tools that may be provided by the user interface. Possible search tools may include the ability to input textual words and/or descriptions of a desired objects via a keyboard or touchscreen, speaking the name and/or descriptions of a desired object into one or more microphones; using gestures and other movements and/or drawings to describe a desired objects that may be captured and interpreted by one or more motion capture devices, uploading and/or scanning images of a desired product, and any other similar electronic search tools currently known by those skilled in the relevant art(s) and/or will be known in the future.

In an embodiment, a description algorithm is contained within the computing device 104, catalog kiosk 130, and/or the manufacturing system 132 that may be capable of forming and/or various descriptions and tags for objects within the catalog database 112 such that when people provide less than optimal object descriptions, the correct object may still be found.

At step 410, the user interface queries the user 102 as needed to obtain more information about what kind of object is desired. By way of example and not limitation, the user 102 may verbally assert that a screw is desired for generation by the system 132. In response to such an assertion, the user interface may ask user 102 what type the screw should be. The query may be in the form of a voice generated by a speaker, text displayed on a screen, and/or any similar form as may be apparent to those skilled in the relevant art(s) after reading the description herein. The user 102 may respond via any of the ways discussed above in relation to step 408.

At step 412, all of the information provided by the user 102 is used by processors, controllers, and similar computing modules within the computing device 104, catalog kiosk 130, or manufacturing system 132 to determine which object within the catalog database 112 matches the user 102's request. In an embodiment, the user 102 must verify that the identified object is indeed correct via the user 102 input. In instances where the identified object is incorrect, steps 408, 410, and/or 412 may be repeated until the user 102 is satisfied or abandons the search. Once a satisfactory object is found, it may be displayed with suggested features, including size, materials, color, and the like. The user 102 may accept the suggested features or choose to adjust them.

At step 414, manufacturing system 132 produces the identified object. The process 400 is terminated by step 416, and the process 400 ends.

Figure 5:
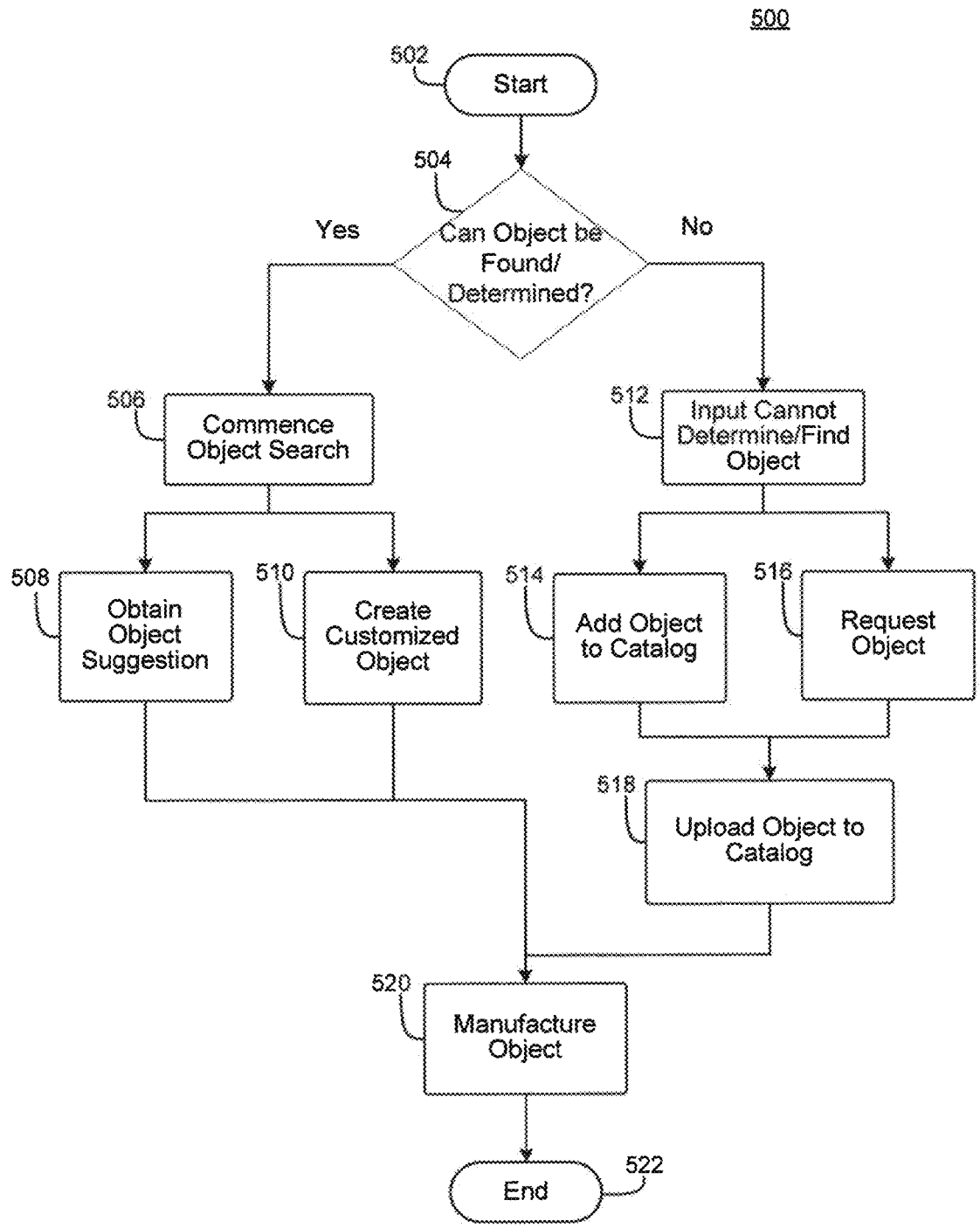
FIG. 5 is a flowchart illustrating an embodiment of a process for alternative ways of manufacturing an object using a manufacturing system integrated with a catalog database when the object may not be contained within the catalog database.

Referring now to FIG. 5, a flowchart illustrating an exemplary process 500 for alternative ways of manufacturing an object using a manufacturing system 132 integrated with catalog database 112 when the object may not be contained within catalog database 112 is shown. The process 500, which may execute with the system 100, begins at step 502 with control passing immediately to step 504.

At step 504, it is determined whether a desired object can be found within the catalog database 112. This determination may be made based on knowledge personally known to the user 102, based on a previous failed search attempt of the catalog database 112, or based on a determination by on computational components within the computing device 104, catalog kiosk 130, and/or manufacturing system 130. If the determination is in the affirmative, the process 500 proceeds to step 506. If the determination is in the negative, the process 500 proceeds to step 512.

At step 506, a search for the desired object is initiated, much like process 400. Step 506 may further include sub-step(s) 508 and/or 510 discussed below.

At step 508, the user 102 receives suggestions for an object to fulfill a certain need when the precise object desired is unknown. By way of example and not limitation, the user 102 may desire an object to fix a leaking pipe. Based on entering information and answering questions as in process 400, the system 100 may provide a suggestion to the user 102 of one or more objects within the catalog database 112 to fulfill the intended purpose. Additionally, regardless of whether the specific desired object is known or unknown to the user 102, the system 100 may provide suggestions for how to generate the object once it is selected. Such suggestions may include what material to use, what the manufacturing system 132 to use, what size to make it, what features it should have, as well as other similar suggestions as will be apparent to those skilled in the relevant art(s) after reading the description herein.

At step 510, the user 102 opts to create a customized object. The customized object may be based on an object within the catalog database 112 or may be designed entirely by the user 102. In such aspects when the user 102 creates a customized object, the computing device 104, catalog kiosk 130, and/or manufacturing system 132 may be configured with computer-aided design software to help design an object that will not break due to design flaws. A newly created object may be stored in the catalog database 112 within a digital data file that allows for parameterization of the file, thereby allowing for modifications to be made without causing errors and/or requiring a significant amount of computational power to complete a manufacturing cycle.

At step 512, the user 102 provides an input communication to the user interface that the desired object cannot be determined or found. In another embodiment, the user interface receives such information directly from the computing device 104, catalog kiosk 130, and/or manufacturing system 132. Step 512 may further comprise sub-steps 514 and 516, as discussed further below.

At step 514, the user 102 adds an object to the catalog database 112. This process will be discussed in greater detail below in association with FIG. 7.

At step 516, the user 102 makes a request for an object that is not included within the catalog database 112. Such a request may be stored within the catalog database 112 as part of a compilation of desired objects. Other users 102 may periodically view the compilation of desired objects and make requested additions to the catalog 112 by scanning objects as they are able. In an embodiment, a desired object is known to be produced by a certain company or individual. In such an embodiment, the system 100 may be configured to provide a communication link to the user 102 in order to send an object request directly to the company or individual. The communication link may comprise a telephone number and/or connection link, such as an email address and/or connection link, as well as any similar connection s will be apparent to those skilled in the relevant art(s) after reading the description herein.

At step 518, the user 102 added object and/or the fulfilled object request is uploaded to the catalog 112 where it may be stored and accessed later by any user 102.

At step 520, the object is produced by manufacturing system 132. The process 500 is terminated by step 522 and process 500 ends.

Figure 6:
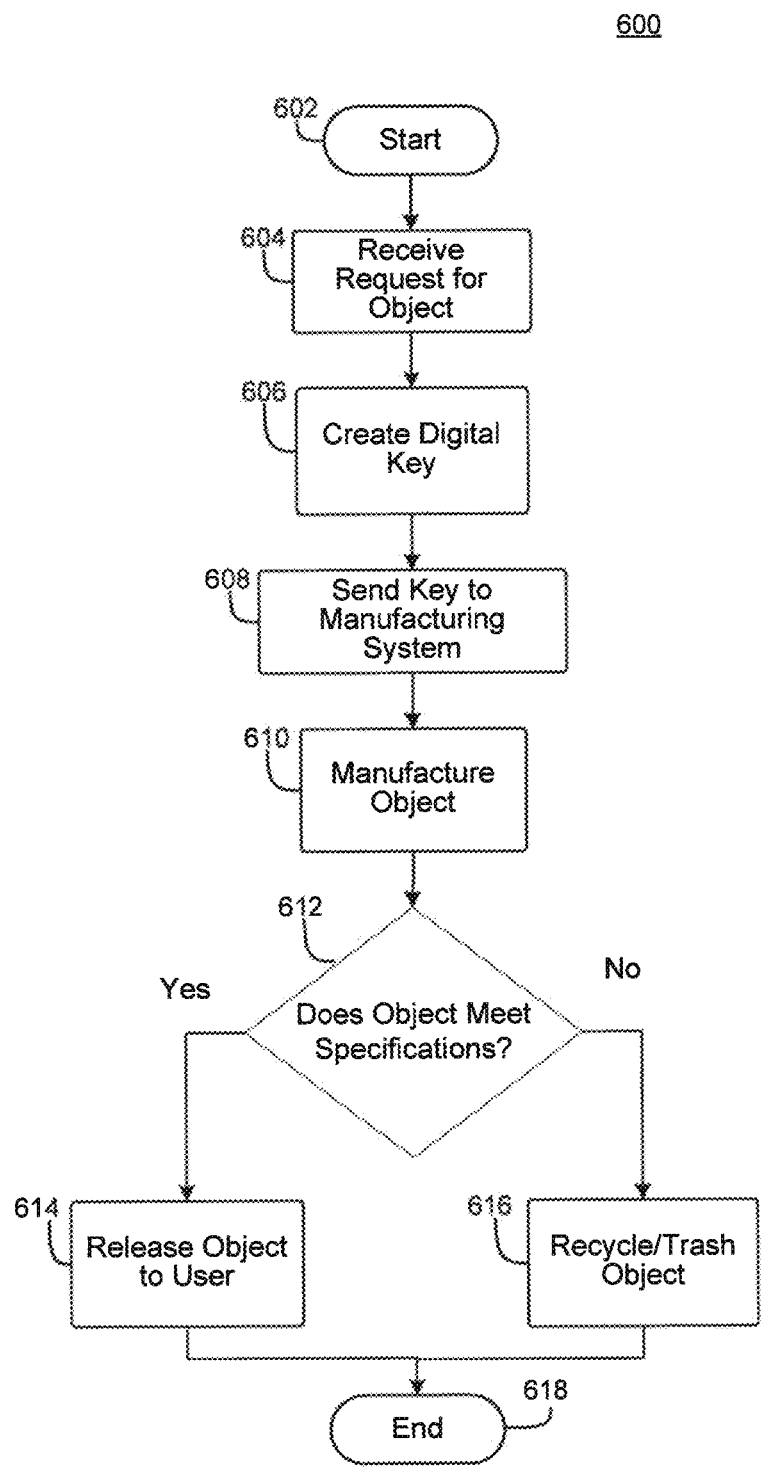
FIG. 6 is a flowchart illustrating an embodiment of a process for generating an appropriately licensed object via a manufacturing system integrated with a catalog database.

Referring now to FIG. 6, a flowchart illustrating an embodiment of a process 600 for generating an appropriately licensed object via manufacturing system 132 integrated with catalog database 112 is shown. The process 600, which may execute within system 100, begins at step 602 with control passing immediately to step 604. At step 604, the system 100 receives a request for a specific object to be generated that requires licensing. The request may be received via the computing device 104, catalog kiosk 130, and/or manufacturing system 132 using any of the input devices described previously.

At step 606, the system 100 creates a digital key for the desired object via the user interface associated with the computing device 104, catalog kiosk 130, and/or manufacturing system 132 as part of a token-based digital rights management system. By way of example and not limitation, cryptographic hashes may be used to create an authenticated digital inventory of objects, ensuring that only properly licensed and authenticated objects are produced. Other forms of authentication and digital rights management may be used as may be apparent to those skilled in the relevant art(s) after reading the description herein. The digital rights management system may function regardless of whether the catalog kiosk 130 and/or the manufacturing system 132 are connected to network 128 at the time an object is generated. The catalog database 112 may be updated with and adjusted digital inventory at the next time a connection to the network 128 is provided based on information stored locally within the catalog kiosk 130 and/or the manufacturing system 132.

At step 608, the digital key is sent to the manufacturing system 132. This grants the manufacturing system 132 permission to access the three-dimensional models and/or computational instructions to generate the desired object associated with the digital key.

At step 610, the desired object is generated. At step 612, it is determined whether the generated object is in fact an authentic form of the desired object. It is additionally determined if the generated object contains any flaws. This determination may be made upon visual inspection by the user 102, sensors and/or cameras associated with the manufacturing system 132, and/or any other means as may become apparent to those skilled in the relevant art(s) after reading the description herein. If the determination is in the affirmation, the process 600 proceeds to step 614. If the determination is in the negative, process 600 proceeds to step 616.

At step 614, the manufacturing system 132 releases the generated object to the user 102. This may be accomplished by unlocking a door/panel that the user 102 may open to reach inside the manufacturing system 132 and remove the object, or by any similar means as may become apparent to those skilled in the relevant art(s) after reading the description herein.

At step 616, the manufacturing system 132 recycles, trashes, and/or otherwise disposes of the rejected object. Process 600 is terminated by step 618 and process 600 ends.

Figure 7:
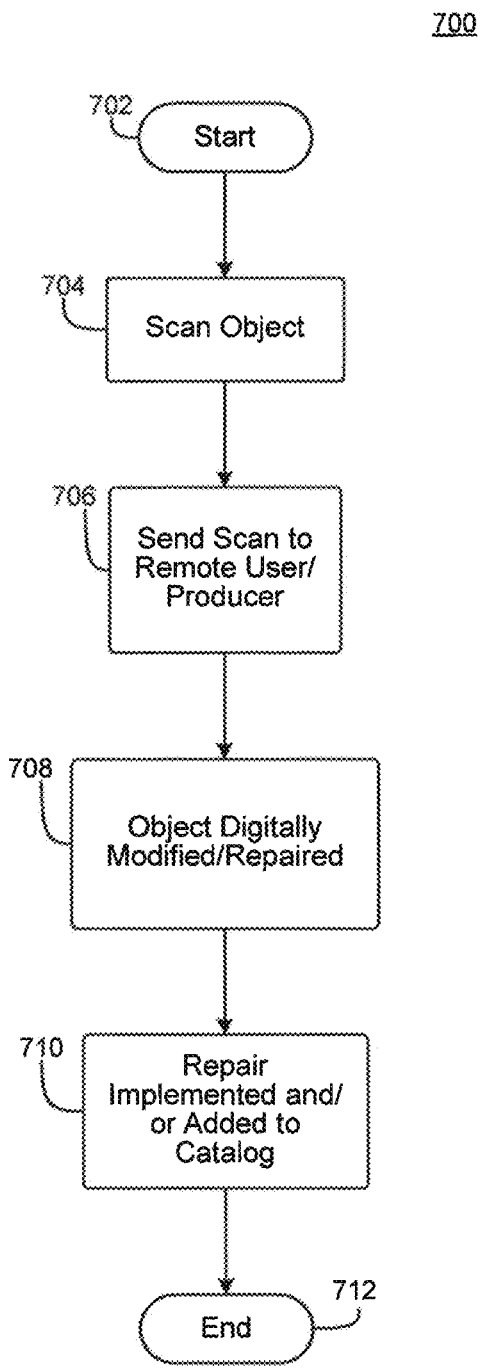
FIG. 7 is a flowchart illustrating an embodiment of a process for obtaining a three-dimensional model and/or computational instructions for repairing a broken/defective object via a manufacturing system that are not included within a catalog database.

Referring now to FIG. 7, a flowchart illustrating an embodiment of a process 700 for obtaining a three-dimensional model and/or computational instructions for repairing a broken/defective object via manufacturing system 132 that are not included within catalog database 112 is shown.

The process 700, which may execute with the system 100, begins at step 702 with control passing immediately to step 704. At step 704, the user 102 obtains a 360 degree scan of the broken object. The scan may be accomplished via cameras, sensors, and/or any similar image capturing devices onboard and/or integrated with the computing device 104, catalog kiosk 130, and/or manufacturing system 132 as recognized by those skilled in the relevant art(s).

At step 706, the scanned image(s) are sent to a remote user 102 and/or an object manufacturer/producer that has the skills/means to design a fix for the broken/defective object. The image(s) may be sent via the network 128 using any electronic communication means recognized by those skilled in the relevant art(s), including email, MMS message, and the like.

At step 708, the digital modifications/repairs are made by the expert user 102 and/or manufacturer/producer based on the received scans. In and embodiment, computational components within the computing device 104, catalog kiosk 130, and/or manufacturing system 132 are able to digitally design modifications/repairs. In an embodiment, the user 102 is able to digitally design a modification/repair using computer-aided design software within the device 104, kiosk 130, and/or system 132.

At step 710, the broken object is repaired/modified once it is placed within the manufacturing system 132 and the digital instructions are received. In an embodiment, the object is not repaired/modified immediately. Regardless of whether the object is actually repaired/modified, the digital instructions for implementing the repair/modification may be stored within the catalog database 112 either for later use and/or to be used by other users 102 who need objects repaired/modified similarly in the future.

The process 700 is terminated by step 712 and process 700 ends.

Figure 8:
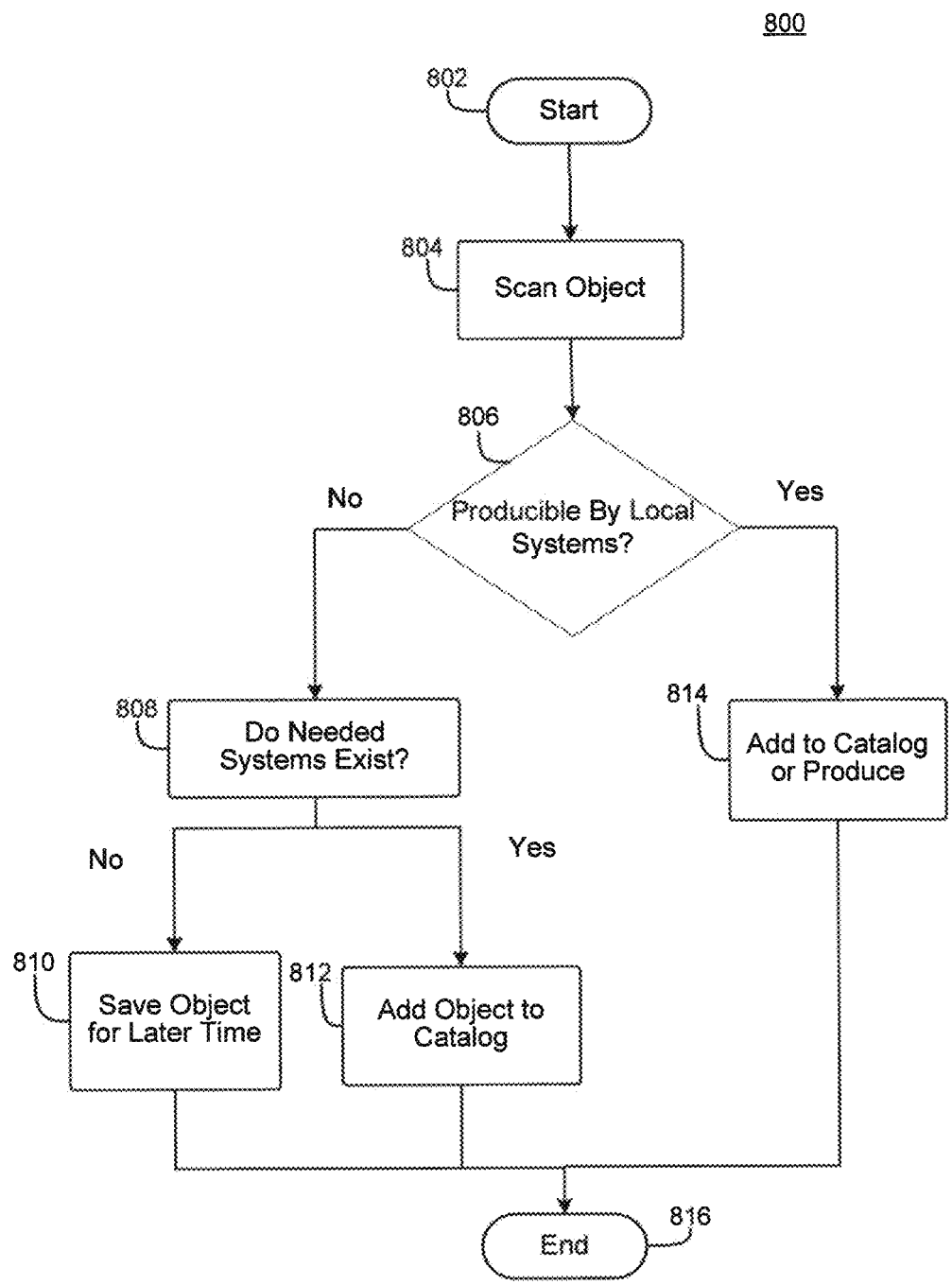
FIG. 8 is a flowchart illustrating an embodiment of a process for adding an object to a catalog database.

Referring now to FIG. 8, a flowchart illustrating an embodiment of a process 800 for adding an object to catalog database 112 is shown. The process 800, which may execute within system 100, begins at step 802 with control passing immediately to step 804. At step 804, the user 102 obtains a 360 degree scan of an object to be added to the catalog database 112 as in step 704 of process 700.

At step 806, it is determined whether the scanned object is capable of being generated by the manufacturing system 132 associated with the scanning device that was used to scan the object. By way of example and not limitation, if cameras integrated with the catalog kiosk 130 were used to scan the object, then it will be determined whether the manufacturing system 132 associated with that catalog kiosk 130 is capable of generating the object. Such a determination may be made by processors, controllers, and similar computational modules within the computing device 104, catalog kiosk 130, and/or manufacturing system 132 as recognized by those skilled in the relevant art(s). If the determination is in the negative, the process 800 proceeds to step 808. If the determination is in the affirmation, the process 800 proceeds to step 814.

At step 808, it is determined if any computational system 132 currently exists that is capable of generated the scanned object. Again, this determination may be made by the same processors, controllers, and similar computational modules of step 806. If the determination is in the negative, the process 800 proceeds to step 810. If the answer is in the positive, the process 800 proceeds to 812.

At step 810, the scanned object is saved for a later time for when a computing system 132 is developed that is capable of generating it. In some aspects, the scanned object may be stored within a special portion of the catalog database 112 designated for objects that are desired to be generated in the future. The system 100 may automatically determine when technology exists that is capable of generating the object. In an embodiment, a notification of such capability is sent to one or more users 102 that are known to be desiring generation of the object.

At step 812, the scanned object capable of generation by some manufacturing system 132 is added to the catalog database 112. In an embodiment, algorithms within the computing device 104, catalog kiosk 130, and/or manufacturing system 132 that was used to complete the scan may indicate to user 102 what type of manufacturing system 132 may be capable of generating the object and where that system 132 may be located.

At step 814, the scanned object that is capable of generation by the manufacturing system 132 associated with the scanning components within the device 104, kiosk 130, or itself is added to the catalog database 112 and/or generated by the manufacturing system 132.

Process 800 is terminated by step 816 and process 800 ends.

FIG. 9 is a block diagram of an embodiment of a more generalized system disclosed herein. The manufacturing system 132 is disclosed. As part of the manufacturing system 132 is at least one manufacturing device 200 to apply at least one additive manufacturing process to create a produced object and/or to repair an existing object.

A user interface 910 is shown. Though a single user interface 910 is shown, more than one user interface may be a part of the system 900. The user interface 910 may be integral to the manufacturing system 132 or may be separate with a direct connection to the manufacturing system 132. Therefore, the illustration in FIG. 9 is not provided to be limiting as to how these elements may be integrated to work together. The user interface 910 may query a user for additional information when insufficient information is provided to locate the three-dimensional content within the catalog database 112.

A scanner 920 is also shown. In an embodiment, the scanner 920 may be provided to evaluate at least one of the produced object and the repaired existing object to determine whether acceptable for use. In another embodiment, the scanner 920 may be provided to acquire information for additive manufacturing from the existing object wherein the acquired information is storable in the catalog database. In yet another embodiment, the scanner 920 or a plurality of scanners perform both of these functions. The a recycler 300, as disclosed above, to recycle the at least one of produced object and repaired existing object for use as feedstock for a later performed at least one additive manufacturing process is shown.

A processor is shown 930. The processor may operate with a description analyzer 940, disclosed above, to narrow an input provided with the user interface to locate desired of three-dimensional content within the catalog database. The processor 930 may also operate with the user interface 910 and a verifier 950 to authenticate a user prior to granting use of the system 900. The processor may also operate with a digital key creator 960 to authenticate the three-dimensional content provided to the manufacturing system 132 from the catalog database 112.

The catalog database 112 for retaining a plurality of three-dimensional content for use to at least one of create a produced object and repair an existing object with at least one additive manufacturing process is also disclosed where a communication infrastructure 101, 128 provides for real-time communication between the catalog database and the one or more user interfaces.

Though the connections between the elements in FIG. 9 appear to show a sequential connection, these connections are just provided to Show a relationship collectively within the system 900. As such, the connections may not necessarily be direct to a particular element but my simply be a pass through to a next element. Furthermore, certain elements may be part of a single system or kiosk, as disclosed herein.

Figure 10:
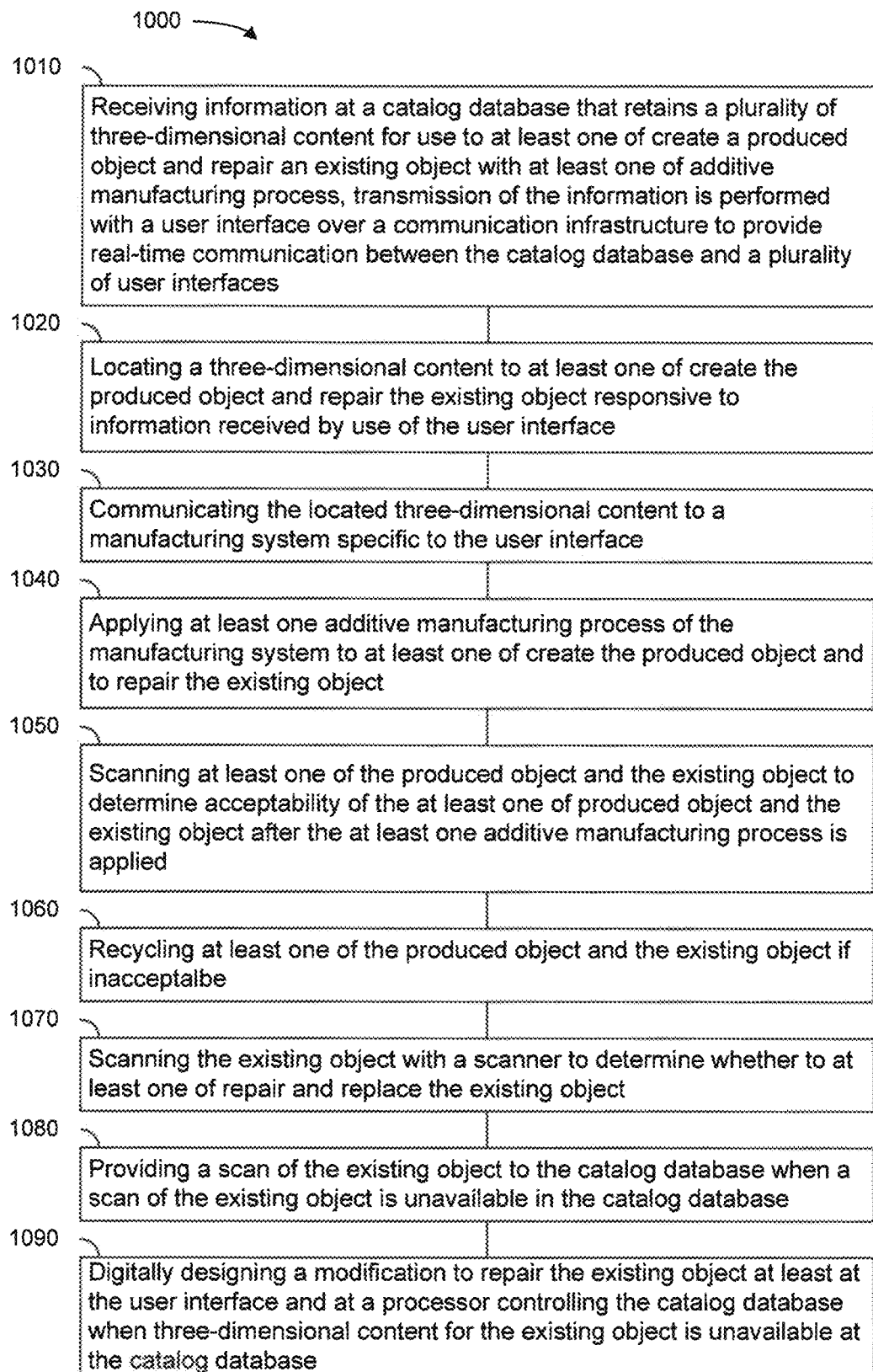
FIG. 10 is a flowchart illustrating an embodiment of a manufacturing method disclosed herein.

FIG. 10 is a flowchart illustrating an embodiment of a manufacturing method disclosed herein. The method 1000 comprises receiving information at a catalog database that retains a plurality of three-dimensional content for use to at least one of create a produced object and repair an existing object with at least one of additive manufacturing process, transmission of the information is performed with a user interface over a communication infrastructure to provide real-time communication between the catalog database and a plurality of user interfaces, at 1010. The method 1000 further comprises locating a three-dimensional content to at least one of create the produced object and repair the existing object responsive to information received by use of the user interface, at 1020. The method 1000 also comprises communicating the located three-dimensional content to a manufacturing system specific to the user interface, at 1030. The method 1000 further comprises applying at least one additive manufacturing process of the manufacturing system to at least one of create the produced object and to repair the existing object, at 1040.

The method 1000 may also comprise scanning at least one of the produced object and the existing object to determine acceptability of the at least one of produced object and the existing object after the at least one additive manufacturing process is applied, at 1050. The method 1000 may also comprise recycling at least one of the produced object and the existing object if unacceptable, at 1060. The method 1000 may also comprise scanning the existing object with a scanner to determine whether to at least one of repair and replace the existing object, at 1070. The method 1000 may also comprise providing a scan of the existing object to the catalog database when a scan of the existing object is unavailable in the catalog database, at 1080. The method 1000 may also comprise digitally designing a modification to repair the existing object at least at the user interface and at a processor controlling the catalog database when three-dimensional content for the existing object is unavailable at the catalog database, at 1090.

Though the steps in FIG. 10 are shown in sequence, they do not have to be performed in sequence. Furthermore, each of dependent steps 1050-1090 may be performed in combination with or without the other independent steps. Showing these steps in sequence is done simply to show a possible, non-limiting visualization.

Figure 11:
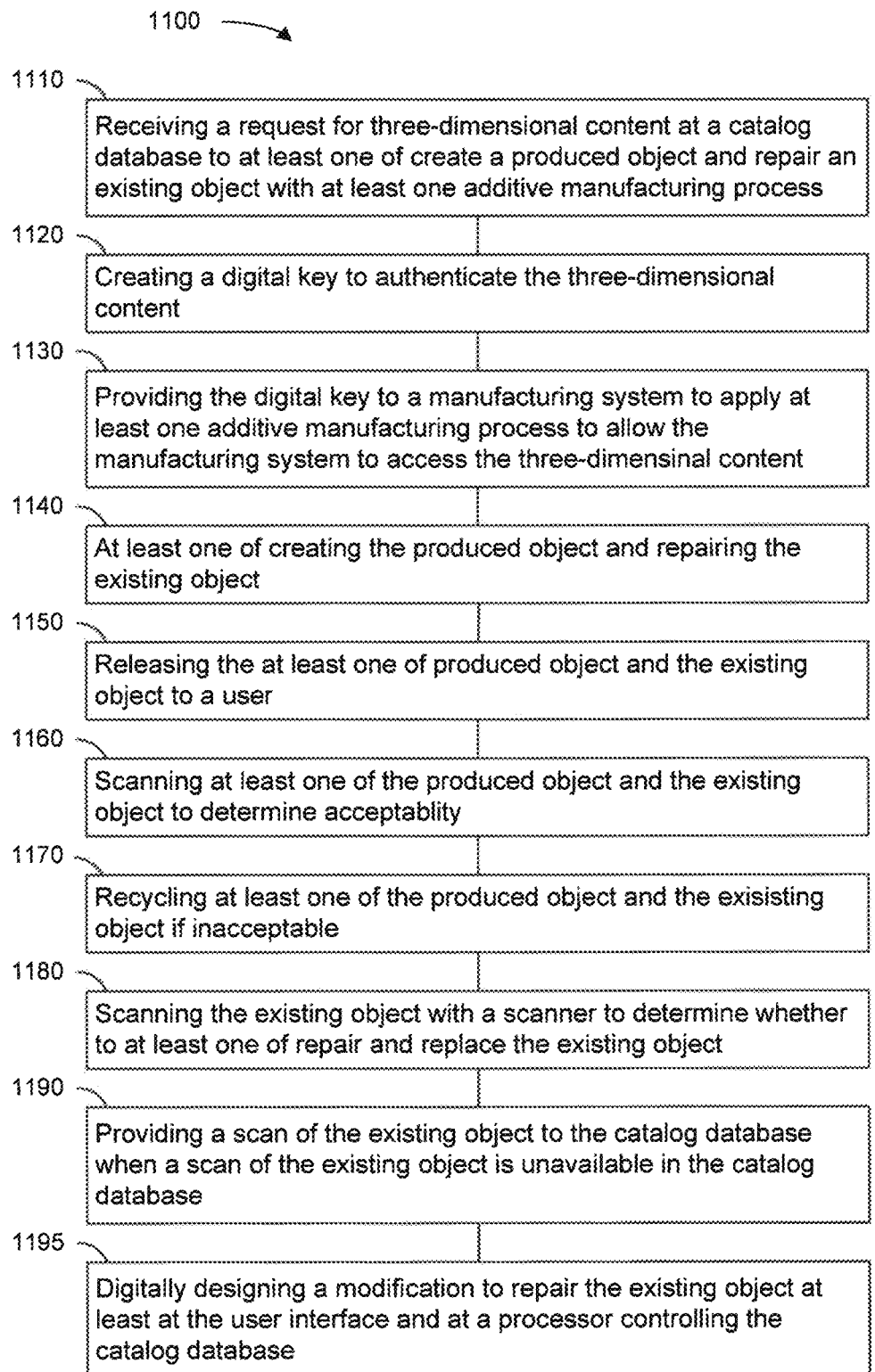
FIG. 11 is a flowchart illustrating an embodiment of another manufacturing method disclosed herein.

FIG. 11 is a flowchart illustrating an embodiment of another manufacturing method disclosed herein. The method 1100 comprises receiving a request for three-dimensional content at a catalog database to at least one of create a produced object and repair an existing object with at least one additive manufacturing process, at 1110. The method 1100 further comprises creating a digital key to authenticate the three-dimensional content, at 1120. The method 1100 also comprises providing the digital key to a manufacturing system to apply at least one additive manufacturing process to allow the manufacturing system to access the three-dimensional content, at 1130. The method 1100 further provides for at least one of creating the produced object and repairing the existing object, at 1140. The method also provide for releasing the at least one of produced object and the existing object to a user, at 1150.

The method 1100 may further comprise scanning at least one of the produced object and the existing object to determine acceptability, at 1160. The method 1100 may further comprise recycling at least one of the produced object and the existing object if unacceptable, at 1170. The method 1100 may further comprise scanning the existing object with a scanner to determine whether to at least one of repair and replace the existing object, at 1180. The method 1100 may further comprise providing a scan of the existing object to the catalog database when a scan of the existing object is unavailable in the catalog database, at 1190. The method 1100 may further comprise digitally designing a modification to repair the existing object at least at the user interface and at a processor controlling the catalog database, at 1195.

Though the steps in FIG. 10 are shown in sequence, they do not have to be performed in sequence. Furthermore, each of dependent steps 1050-1090 may be performed in combination with or without the other independent steps. Showing these steps in sequence is done simply to show a possible, non-limiting visualization.

Figure 12:
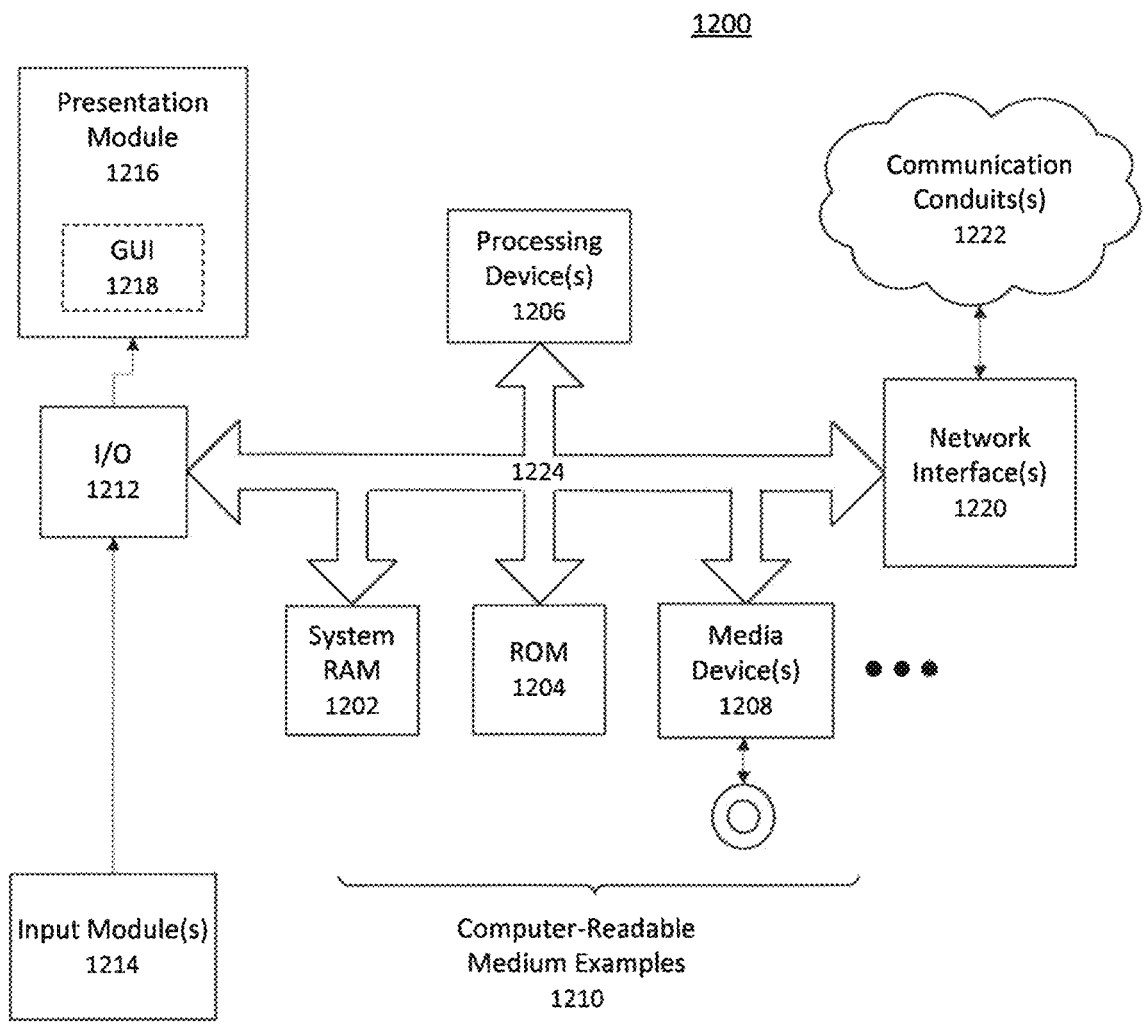
FIG. 12 is a block diagram illustrating an embodiment of a computer system useful for implementing an embodiment disclosed herein.
Figure 12:

Referring to FIG. 12, a block diagram illustrating an exemplary computer system useful for implementing an embodiment is shown. FIG. 12 sets forth an illustrative computer system that may be used to implement a computing functionality 1200, which in all cases represents one or more physical and tangible processing mechanisms.

The computing functionality 1200 may comprise volatile and non-volatile memory, such as RAM 1202 and ROM 1204, as well as one or more processing devices 1206 (e.g., one or more central processing units (CPUs), one or more graphical processing units (GPUs), and the like). The computing functionality 1200 also optionally comprises various media devices 1208, such as a hard disk module, an optical disk module, and so forth. The computing functionality 1200 may perform various operations identified above when the processing device(s) 206 execute(s) instructions that are maintained by memory (e.g. RAM 1202, ROM 1204, and the like).

More generally, instructions and other information may be stored on any computer readable medium 1210, including, but not limited to, static memory storage devices, magnetic storage devices, and optical storage devices. The term "computer readable medium" also encompasses plural storage devices. In all cases, the computer readable medium 1210 represents some form of physical and tangible entity. By way of example, and not limitation, the computer readable medium 1210 may comprise "computer storage media" and "communications media."

"Computer storage media" comprises volatile and non-volatile, removable and non-removable media implemented in any method or technology for storage of information, such as computer readable instructions, data structures, program modules, or other data. Computer storage media may be, for example, and not limitation, RAM 1202, ROM 1204, EEPROM, Flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared, and other wireless media. Combinations of any of the above are also included within the scope of computer readable medium.

The computing functionality 1200 may also comprise an input/output module 1212 for receiving various inputs (via input modules 1214), and for providing various outputs (via one or more output modules). One particular output module mechanism may be a presentation module 1216 and an associated GUI 1218. The computing functionality 1200 may also include one or more network interfaces 1220 for exchanging data with other devices via one or more communication conduits 1222. In some embodiments, one or more communication buses 1224 communicatively couple the above-described components together.

Communication conduit(s) 1222 may be implemented in any manner (e.g., by a local area network, a wide area network (e.g., the Internet), and the like, or any combination thereof). The communication conduit(s) 1222 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices. The features of the present disclosure described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, and the like).

In an embodiment, the catalog, or catalog database, of parts or goods may comprise a plurality of portions, segments or sections of any one of a plurality of parts or goods. A manufacturing process to apply to create and/or install the portion, segment or section of any particular good to repair the good or part may then be determined based on the additive manufacturing reference information maintained in the catalog or as ascertained from a scan of the good or part. Thus, as disclosed herein, the catalog may be used to retain not only manufacturing reference information about a complete part, but it may also be used to retain information about a replacement portion of a part used to repair a portion of the part. The manufacturing reference information may further comprise directions, or control information, for controlling the manufacturing device to prepare an area where the repair it to be performed, such as, but not limited to, removing additional material from the part, and/or the manufacturing process for creating the repair or replacement segment or portion.

As disclosed above, embodiments meet the above-identified needs by providing systems, methods, and computer program products which facilitate the compilation of three-dimensional models and computerized instructions for digitally manufacturing objects into a searchable data repository/database integrated with a manufacturing system.

In an embodiment, the data repository may be completely or partially "cloud-based"; that is, the data may be accessed by a variety of user computing devices via network connectivity to a conglomeration of computational servers upon which the data is stored. A cloud-based configuration allows the data to be accessible to substantially everyone who has a computing device that is able to connect to an information network, such as the internet.

The data repository may further be updateable in that models and instructions may be added to the repository by users for objects not already included in the database. Objects may be included in the database regardless of the ability of current digital manufacturing processes to generate them, thereby fostering the development of new digital manufacturing techniques to keep up with advancements in object designs.

In an embodiment, the database may be accessed without a network connection. In such aspects, the database may be integrated directly with a computing device, such as an electronic kiosk and the like. Furthermore, when no network connection is available, the database may not be updateable until a network connection is initiated/restored.

Regardless of how the database is accessed, be it via a personal computing device, a kiosk, or other similar means, it may allow for user engagement via a user interface. The user interface may be unique, complex, simplistic, and/or common. An embodiment of the user interface includes the ability to ease the process by which a user browses or searches for an object and information associated therewith within the database such as, by way of example and not limitation, by grouping related objects into various categories and subcategories. Objects may be browsed/searched for via clicking and/or scrolling through increasingly narrow object groups, entering keywords to facilitate a text-based search, scanning or otherwise uploading images to be searched, orally stating and/or describing an object, and/or using gestures or other physical movements/actions to describe an object.

In an embodiment, the data repository is integrated with various processors, controllers, and other modules that allow it to perform an assortment of determination functions. The determination functions may include the identification of whether a given object is currently producible via digital manufacturing; what object a user may be searching for based on written, oral, and/or visual descriptions; suggested ways to repair an object and/or create a new object; where and/or how an object may be produced, and the like.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

While various aspects of the present disclosure have been described herein, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures. As will be appreciated by those skilled in the relevant art(s) after reading the description herein, certain features from different aspects of the systems, apparatus and methods of the present disclosure may be combined to form yet new aspects of the present disclosure.

What we claim is:

1. A system comprising:
   a catalog database for retaining a plurality of three-dimensional content for use to repair an existing object with at least one additive manufacturing process;
   one or more user interfaces to access the catalog database at least one of simultaneously and at different times;
   a communication infrastructure to provide for real-time communication between the catalog database and the one or more user interfaces;
   a manufacturing system comprising at least one user interface to apply the at least one additive manufacturing process to repair the existing object;
   a scanner to capture the three-dimensional content of the existing object repair information is not included in the catalog database; and
   a recycler comprising a material control system, a material size reducer to reduce size of material placed within the recycler, an extruder to create a recycled material for use by the manufacturing system, a spooling assembly to receive the recycled material in a filament form as it exits the extruder onto a spool that is placeable into the manufacturing system for utilization, and an environmental control unit to regulate an environment of the recycler device to regulate outgassing and contamination of the environment in which the manufacturing system is located;
   wherein the communication infrastructure provides real-time communication between the scanner and the catalog database regarding the three-dimensional content of the existing object to provide for the three-dimensional content to be saved in the catalog database.

2. The system according to claim 1, wherein the scanner acquires additional three-dimensional content for evaluation of the repaired existing object to determine whether the repaired existing object is acceptable for use.

3. The system according to claim 1, further comprising a kiosk wherein at least one of the one or more user interfaces and the manufacturing system are part of the kiosk.

4. The system according to claim 1, wherein the three-dimensional content comprises a three-dimensional image of the existing object.

5. The system according to claim 1, wherein the user interface further comprises a verifier to authenticate a user prior to granting use of the system.

6. The system according to claim 1, further comprising a description analyzer to narrow an input provided with the user interface to locate desired three-dimensional content within the catalog database.

7. The system according to claim 1, further comprising a digital key creator to authenticate the three-dimensional content provided to the manufacturing system.

8. The system according to claim 1, wherein the user interface queries a user for additional information when insufficient information is provided to locate the three-dimensional content within the catalog database.

9. The system according to claim 1, further comprising an enclosure to house the manufacturing system and scanner and a second environmental controller to regulate the environment within the enclosure to prevent at least one of outgassing and contamination within the enclosure during the at least one additive manufacturing process.

10. The system according to claim 1, wherein:
    the catalog database further comprising a plurality of three-dimensional content for use to create a produced object with at least one additive manufacturing process when the produced object is needed instead of the repaired object;
    the manufacturing system comprising at least one user interface to apply the at least one additive manufacturing process to create the produced object when determined that the produced object is needed instead of the repaired object; and
    the scanner captures the three-dimensional content of the existing object when creation information is not included in the catalog database.

11. The system according to claim 1, wherein the recycler environmental control system and the material control system comprises at least one of a centrifuge and an electromagnet to move material through the recycler.

12. A manufacturing method comprising:
    receiving information at a catalog database that retains a plurality of three-dimensional content for use to repair an existing object with at least one of additive manufacturing process, transmission of the information is initiated to the catalog database with a user interface over a communication infrastructure to provide real-time communication between the catalog database and a plurality of user interfaces;
    locating a three-dimensional content to repair the existing object responsive to information received by use of the user interface;
    communicating the located three-dimensional content to a manufacturing system specific to the user interface;
    capturing the three-dimensional content of the existing object with a scanner when repair information is not included in the catalog database;
    communicating between the scanner and the catalog database regarding the three-dimensional content of the existing object to provide for the three-dimensional content to be saved in the catalog database;
    applying at least one additive manufacturing process of the manufacturing system to repair the existing object based on the three-dimensional content within the catalog database; and
    if the repaired existing object is determined to be unacceptable, recycling the repaired existing object with a recycler comprising a material control system, a material size reducer to reduce size of material placed within the recycler, an extruder to create a recycled material for use by the manufacturing system and a spooling assembly to receive the recycled material in a filament form as it exits the extruder onto a spool that is placeable into the manufacturing system for utilization, and an environmental control unit to regulate an environment of the recycler to regulate outgassing and contamination of the environment in which the manufacturing system is located.

13. The manufacturing method according to claim 12, further comprising scanning the existing object to determine acceptability of the existing object after the at least one additive manufacturing process is applied to repair the existing object.

14. The manufacturing method according to claim 12, further comprising scanning the repaired existing object to create a second three-dimensional content to determine whether repaired existing object is acceptable for use.

15. The manufacturing method according to claim 12, further comprising digitally designing a modification to repair the existing object at least at the user interface and at a processor controlling the catalog database when three-dimensional content for the existing object is unavailable at the catalog database.

16. The manufacturing method according to claim 12, further comprising preventing at least one of outgassing and contamination during the at least one additive manufacturing process with a second environmental controller to regulate the environment at the at least one additive manufacturing process.

17. The manufacturing method according to claim 12, further comprising:
receiving information at a catalog database that retains a plurality of three-dimensional content for use to repair an existing object with at least one of additive manufacturing process further comprising receiving information at the catalog database to create a produced object when determined that the produced object is needed instead of the repaired object;
locating a three-dimensional content to create the produced object, when determined the produced object is needed instead of the repaired object, responsive to information received by use of the user interface;
capturing the three-dimensional content of the existing object with a scanner when creation information is not included in the catalog database; and
applying at least one additive manufacturing process of the manufacturing system to create the produced object based on the three-dimensional content within the catalog database.

18. The manufacturing method according to claim 12, wherein the environmental control system and the material control system comprises at least one of a centrifuge and an electromagnet to move material through the recycler.

19. A manufacturing method, comprising:
receiving a request for three-dimensional content at a catalog database to repair an existing object with at least one additive manufacturing process;
creating a digital key to authenticate the three-dimensional content;
providing the digital key to a manufacturing system to apply at least one additive manufacturing process to allow the manufacturing system to access the three-dimensional content;
if the three-dimensional content to repair an existing object is unavailable in the catalog database, capturing the three-dimensional content of the existing object with a scanner;
communicating the three-dimensional content collected by the scanner to the catalog database;
repairing the existing object with three-dimensional content in the catalog database;
releasing the repaired existing object to a user; and
if the existing object is unacceptable, recycling the object with a recycler comprising a material control system, a material size reducer to reduce size of material placed within the recycler, an extruder to create a recycled material for use by the manufacturing system and a spooling assembly to receive the recycled material in a filament form as it exits the extruder onto a spool that is placeable into the manufacturing system for utilization, and an environmental control unit to regulate an environment of the recycler device to regulate outgassing and contamination of the environment in which the manufacturing system is located.

20. The manufacturing method according to claim 19, further comprising scanning the existing object to determine acceptability.

21. The manufacturing method according to claim 19, further comprising scanning the existing object with a scanner to determine whether to the existing object.

22. The manufacturing method according to claim 19, further comprising digitally designing a modification to repair the existing object at least at the user interface and at a processor controlling the catalog database.

23. The manufacturing method according to claim 19, further comprising preventing at least one of outgassing and contamination repairing the existing object with three-dimensional content in the catalog database with a second environmental controller to prevent at least one of outgassing and contamination caused by the at least one additive manufacturing process.

24. The manufacturing method according to claim 19, further comprising:
receiving a request for three-dimensional content at a catalog database to create a produced object with at least one additive manufacturing process when determined that the produced object is needed instead of the repaired object;
if the three-dimensional content to create a produced object is unavailable in the catalog database, capturing the three-dimensional content of the existing object with a scanner;
creating the produced object with three-dimensional content in the catalog database; and
releasing the produced object to a user.

25. The manufacturing method according to claim 19, wherein the environmental control system and the material control system comprises at least one of a centrifuge and an electromagnet to move material through the recycler.

* * * * *